United States Patent [19]

Holt

[11] 3,711,955
[45] Jan. 23, 1973

[54] ALIGNMENT DEVICE
[76] Inventor: Ralph Holt, 3153 Hull Ave., Memphis, Tenn. 38112
[22] Filed: Oct. 30, 1970
[21] Appl. No.: 85,339

[52] U.S. Cl.....................33/181 R, 33/84, 33/172 R
[51] Int. Cl................................................G01b 3/38
[58] Field of Search....33/181 R, 181 AT, 180 R, 180 AT, 33/84, 174 G, 203.2, 203.17, 203.19, 172 R, 172 D, 169 D

[56] References Cited

UNITED STATES PATENTS

| 3,187,439 | 6/1965 | Leach | 33/181 R |
|---|---|---|---|
| 685,288 | 10/1901 | Miller | 33/181 R |
| 2,316,850 | 4/1943 | Farr | 33/84 |

Primary Examiner—William D. Martin, Jr.
Attorney—John R. Walker, III

[57] ABSTRACT

A device for ascertaining axial and/or radial misalignment between the flanges of the power outlet or driving shaft of a large engine or heavy machine and the input or driven shaft of a massive accessory drive, i. e., a speed increaser or the like, with the flanges, not being intended to be mated one to the other directly but being rotatably connected by a high speed geartype coupling, or the like. The device includes a pair of pointed rods which are suitable supported inwardly thereof, the points of the rods being urged outwardly against the driving and driven shafts so as to engage the respective rotating axes thereof, and at least a pair of measuring instruments that respectively have plungers which, when depressed, actuate meter movements having dials calibrated in mils. The measuring instruments are suitably supported at opposite ends of the main body of the device so that the respective plungers thereof may engage the face portions of the flanges of the driving shaft and the driven shaft. The device is intended to be manually rotated about its longitudinal axis which causes the plungers to rotate in unison about the respective face portions of the flanges of the driving shaft and the driven shaft for sensing the quadrants of these flanges that are misaligned and indicating the magnitude of misalignment on the respective dials thereof.

6 Claims, 4 Drawing Figures

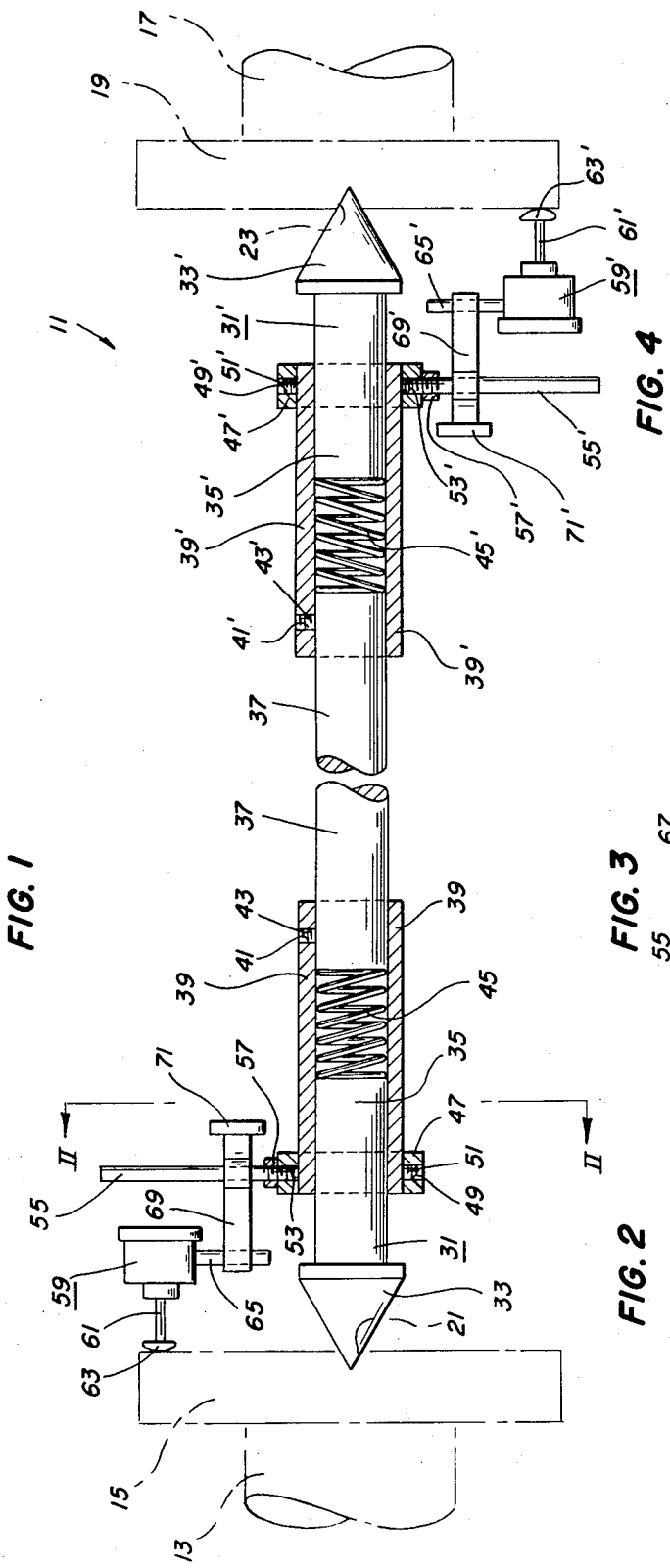
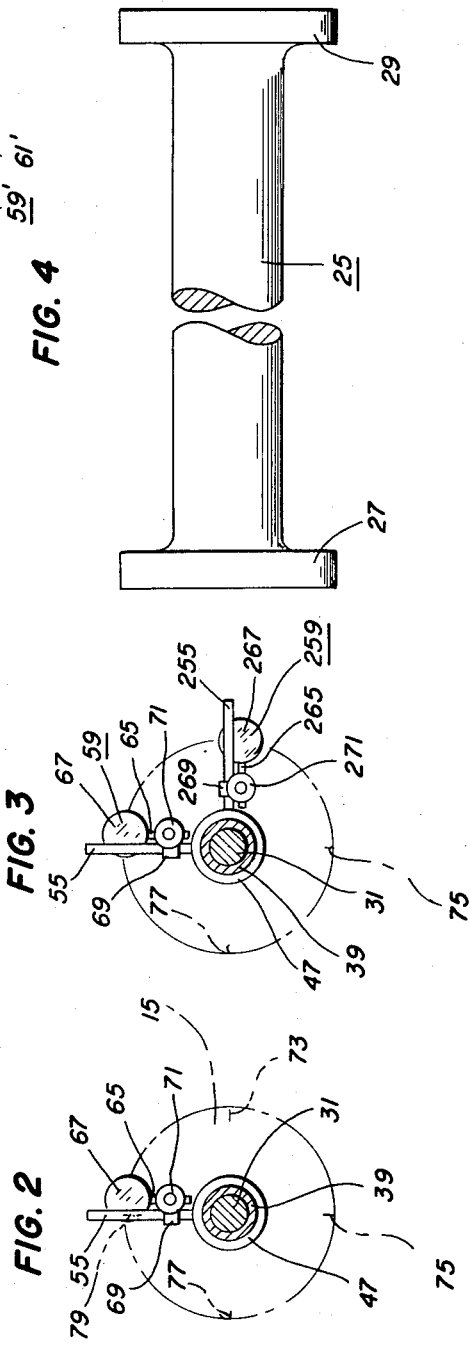

ALIGNMENT DEVICE

BACKGROUND OF THE INVENTION

1. Field of the Invention

This invention relates to alignment devices for use in the art of machine mechanics and directed particularly towards axially and radially aligning a driving shaft to a remote driven shaft.

2. Description of the Prior Art

The usual practice in solving the problem of aligning a driven shaft with a remotely located driving shaft is to fabricate a bracket commonly referred to in the art as a "Christmas tree" having a predetermined length depending upon the distance between the driving shaft and the driven shaft. The one end of the Christmas tree is provided with a base portion which contiguously engages the face portion of the driven shaft and is secured thereto by a plurality of bolts. Perpendicular to the base portion and fixedly attached thereto is a stanchion having a predetermined length depending upon the span between the flanges of the two shafts. The stanchion is usually supported by a second member angularly disposed from the perpendicular stanchion which is fixedly attached at the one end to the base portion and at the other end to the stanchion adjacent the outermost end thereof, hence the term "Christmas tree." An L-shaped member is slidably attached adjacent the outermost end of the stanchion so that one leg of the member is parallel to the face portion of the opposite shaft from the shaft which receives the base, so that an indicating device having an actuating plunger may be slidably attached thereto with the plunger thereof engaging the outer periphery of the flange portion of the shaft. The other leg of the L-shaped member is directed outwardly from the stanchion and protrudes beyond the face portion of the shaft and slidably receives a second indicating device being identical to the first indicating device, so that the actuating plunger thereof may engage the outer circumference portion of the flange of the driving shaft. The driven shaft is then manually rotated so as to cause the L-shaped member having the two instruments attached thereto to rotate about the flange of the driving shaft. Readings are obtained preferably at four points about the flange, i.e., 90°; 180°; 270° and 360°. The entire device is then removed from the driven shaft and mounted to the driving shaft in like manner as above described for the driven shaft. The engine or machinery having the driving shaft is then manually rotated so as to cause the L-shaped member having the indicating devices attached thereto to rotate about the flange of the driven shaft in like manner as described for the driving shaft. Readings are again obtained at the four positions. The necessary computations are made to determine the direction and magnitude of movement required to properly position the machine having the driven shaft so that the rotating axis thereof is both axially and radially aligned at a predetermined distance removed from the driving shaft whereby a coupling means may be connected to the flanges of the driving shaft and the driven shaft, i.e., a procedure well known to those skilled in the art. Obviously, this procedure is time-consuming, and manually rotating this heavy machinery having these shafts attached is a difficult task.

A second means of aligning one shaft to another is known by the applicant: The Leach U.S. Pat. No. 3,187,439 pertains to an alignment gauge which is adapted to measure the small misalignment between a driving shaft and a driven shaft intended to be connected by a flexible drive shaft. This invention utilizes degree indicator instruments for bringing the one shaft within typical limits, i.e., 3½° from true alignment. The U.S. Pat. No. 3,187,439 readily concedes that perfect alignment between a driven and a driving shaft is not taught, e.g., on lines 48 – 51, column 3, concerning the operation of the gage, Leach states: "If either reading exceeds the permissible limit, the accessory will be adjusted with the gage installed so that the misalignment at each end is within limits as determined by subsequent readings." Further, the U.S. Pat. No. 3,187,439 device is not directed towards the environment for which the present invention is directed, i.e., the U.S. Pat. No. 3,187,439 device is directed toward aligning external shafts which have mating teeth and threads or are void of a flange.

Other patents which are known to the applicant are: The Miller U.S. Pat. No. 685,288; the Anderson U.S. Pat. No. 2,484,801; the Christian U.S. Pat. No. 2,516,854 and the Johnson U.S. Pat. No. 2,700,224. None of these patents are directed towards solving the problem of aligning a driven shaft terminating with a flange portion to a driving shaft terminating with a flange portion.

SUMMARY OF THE INVENTION

The present invention is directed towards overcoming the disadvantages and problems relative to previous alignment devices. The concept of the present invention is to provide an alignment device which may be used for aligning heavy equipment, e.g., a turbine engine to a speed increaser or the like, wherein the output or driving shaft of the turbine engine terminates with a flange portion and the input or driven shaft of the speed increaser terminates with a flange portion which is a remote distance from the flange portion of the turbine engine, with the two flanges being intended to be coupled with a high speed balanced coupling.

The device of the present invention is dependent upon the shafts which are to be connected having the usual concentric or axially aligned conical shaped socket on the face of each flange. The device may be used for ascertaining the axial and/or radial misalignment between the flanges of the turbine engine and the speed increaser, i.e., any misalignment is objectionable and results in excessive vibration and/or damage to the equipment.

It should be pointed out that with the advent of the gas turbine engine and its high rpm, i.e., 12,000 – 14,000 rpm, prior means for coupling output shafts to input shafts are unacceptable, e.g., the well known universal joint or the flexible shaft or the like. Machinery rotating at an rpm of this magnitude must be precision balanced in every respect, i.e., every bolt coupling the two shafts is balanced, etc. A typical tolerance of vibration is 1½ mils, e.g., the Rovery compressor.

The device includes a pair of pointed rods which are suitably supported inwardly with the points being urged outwardly against the conical sockets of the two flanges, and at least a pair of measuring instruments that respectively have plungers which, when depressed, actuate meter movements having dials calibrated in mils. The measuring instruments are suitably supported at opposite ends of the device so that the respective plungers thereof may engage the face portions of the flanges. The device is manually rotated which causes the plungers to rotate in unison, i.e., the plungers slidably engaging the periphery of the face portions of the flanges, for sensing the quadrants of these flanges that are misaligned and indicating the magnitude of misalignment on the respective dials thereof.

BRIEF DESCRIPTION OF THE DRAWING

FIG. 1 is a side elevational view showing the device in a preferred position between two shafts, the shafts being phantomized and only the portion adjacent the flange thereof being depicted, also portions of the device are sectionalized to better illustrate certain structure.

FIG. 2 is a sectional view taken as on the line II—II of FIG. 1.

FIG. 3 is the same as FIG. 2 depicting a second embodiment.

FIG. 4 is a side elevational view of a high speed gear type coupling for rotatably coupling the two flanges.

DESCRIPTION OF THE PREFERRED EMBODIMENT

The alignment device 11 of the present invention is adapted for use in ascertaining misalignment between a driving shaft and a driven shaft, the shafts having flange portions which are intended to be rotatably connected. The device 11 is particularly directed toward heavy equipment which cannot be brought into alignment by merely tightening coupling bolts. Additionally, the device 11 of the present invention is directed towards equipment, e.g., high rpm gas turbine engines or the like, having shafts which cannot be connected in the more conventional manner, i.e., universal joints or flexible drive shafts, but require precision alignment between the shafts of the two machines.

Referring now to FIG. 1 of the drawings wherein the device 11 is shown in a typical environment, i.e., between a driving shaft 13 having a coupling flange 15 and a driven shaft 17 having a coupling flange 19. The face portions of the respective flanges 15, 19 are provided with conical sockets or live centers 21, 23 at the time of manufacture, i.e., a normal procedure in machining or fabricating a shaft. The sockets 21, 23 have the usual 60° between opposite sidewalls.

It should be understood that the face portions of the flanges 15, 19 are provided with suitably aligned apertures (not shown) for attaching thereto a high speed balanced coupling 25 (FIG. 4). The coupling 25 is offered in various sizes to span the distance between 15, 19, e.g., a 4 inch span; a 12 inch span; a 24 inch span and a 36 inch span, etc. The coupling 25 depicted in FIG. 4 has a flange 27 at the one end and a flange 29 at the other end. The flanges 27, 29 have a diameter substantially equal to the flanges 15, 19 and are likewise provided with apertures (not shown) which are in alignment with the aforementioned apertures for the flanges 15, 19.

High speed rotation of any machine, e.g., a gas turbine rotating at 12,000 — 14,000 rpm's, requires precision alignment as well as precision balancing of the components, i.e., even the bolts coupling the flanges 15, 27; 19, 29 must be balanced. Also, the flanges 15, 27; 19, 29 are provided with alignment indicia (not shown) to insure that the machine elements are assembled in a preferred position, a further measure to minimize vibration.

It should be understood that while the coupling 25 (FIG. 4) is shown as one example for coupling the flanges 15, 19, there are various types of couplings which differ from the coupling 25 as depicted, e.g., the sleeve-type coupling or the like. The device 11 is intended for precision alignment of any two spaced apart shafts having opposing face portions of respective flanges, like the flanges 15, 19 depicted in FIG. 1, irrespective of the type coupling associated therewith.

Since the device 11 comprises structure at one end thereof which is identical to structure at the other end, a detailed disclosure for the structure at one end will be intended for like structure at the other end. Additionally, the same numeral will be used to identify duplicating structure with a prime mark following the numeral for the twin structure.

The device 11 includes an elongated rodlike member 31 having a conical head portion 33 at the one end thereof. The main body 35 of the member 31 comprises a right cylindrical shape which extends to the end opposite the head portion 33. The preferred shape of the conical head portion 33 is substantially as depicted in FIG. 1, i.e., a 60° angle between opposite surfaces, and the end terminates at a point along the longitudinal centerline thereof. However, it should be understood that the head portion 33 may optionally be terminated with a ball point (not shown) which would be axially received in the conical sockets 21, 23 without departing from the spirit and scope of the present invention.

The device 11 of the present invention also includes a rodlike member or spacer mandrel 37, the outside diameter of which preferably has a dimension exactly equal to the dimension of the outside diameter of the main body 35 of the member 31.

Additionally, the device 11 includes a tubular member or assembly retainer barrel 39 for telescopically receiving at the one end thereof a portion of the main body 35 and at the other end thereof a portion of the spacer mandrel 37. Obviously, the inside diameter of the assembly retainer barrel 39 preferably is slightly greater than the outside diameter of both the main body 35 and the spacer mandrel 37, i.e., a close slidable fit so as to assure that the rodlike members 31, 37 are retained in a position which assures that the longitudinal axes thereof are coincident with an extension of the rotating axes of the shafts 13, 17 when the shafts are in alignment, and that the assembly retainer barrel 39 is precisely concentric with the rodlike members 31, 37. The assembly retainer barrel 39 is provided at the one end thereof with a transversely drilled and threaded aperture 41 extending through one wall thereof. The aperture 41 threadedly receives a set screw 43 for removably fixedly attaching the spacer mandrel 37 to the assembly retainer barrel 39. It should be apparent to those skilled in the art that the close fit tolerance between the spacer mandrel 37 and the barrel 39 will not allow for scoring of the surface of the spacer mandrel 37, accordingly, the set screw 43 preferably has an oval point so as to minimize scoring of the spacer mandrel 37.

Further, the device 11 includes an elongated compression or die spring 45 of suitable length and the convolutions thereof having circumference dimensions substantially equal to the circumference of the rodlike members 31, 37 so as to be concentrically received within the barrel 39, substantially as illustrated in FIG. 1, i.e., one convolution thereof resting against the one end of the space mandrel 37 and the opposite convolution thereof resting against the end of the main body 35, the spring 45 and the rodlike member 31 being unrestrained. Obviously, the device 11 in its extended position before placement between two opposing flanges, such as the flanges 15, 19, should have an overall length, i.e., a distance from the apex of the head portion 33 to the apex of the head portion 33', greater than the distance between the apices of the sockets 21, 23. Accordingly, in order to place device 11 between flanges 15, 19, the rodlike members 31, 31' are manually pushed inwardly toward the spacer mandrel 37 until the head portions 33, 33' are in line with the sockets 21, 23, at which time, releasing the device 11 will enable the die springs 45, 45' to urge the rodlike members 31, 31' outwardly so as to respectively engage the conical head portions 33, 33' with the sockets 21, 23.

Further, the device 11 includes a ringlike adjustable collar 47 having an inside diameter slightly greater than the outside diameter of the barrel 39, i.e., a close slip fit so as to insure that the collar 47 assumes a precise concentric relationship with the rodlike member 31. The collar 47 is provided with a transversely drilled and threaded aperture 49 for threadedly receiving a set screw 51, the set screw 51 preferably being of the oval point type for like reasons as explained for the set screw 43. The collar 47 additionally is provided with a transversely drilled threaded aperture 53 for threadedly receiving an elongated instrument support rod 55. The instrument support rod 55 has one end thereof suitably threaded for threaded engagement into the aperture 53 and for receiving a jam nut 57, i.e., the rod 55 is inserted into the aperture 53 a distance which will insure that the inner end thereof does not protrude beyond the inside diameter surface of the collar 47 and the jam nut 57 is securely tightened against the outer circumference of the collar 47.

Further, the device 11 includes the incorporation of at least one instrument 59, e.g., a Starrett Universal Dial Test Indicator No. 196 manufactured by the L. S. Starrett Co., Athol, Mass. The instrument 59 has a center point or actuating plunger 61, a contact button 63, a support stem 65 and a circular dial 67 calibrated in mils. The instrument 59 preferably is rigidly supported by the support stem 65 in a suitable manner and inward pressure against the contact button 63 causes the actuating plunger 61 to move inwardly toward the dial 67, thus actuating the meter movement (not shown) causing the indicator hand (not shown) to rotate, and thus indicating on the face of the dial 67 the distance which the contact button 63 traveled, i.e., the distance being measured in 0.001 inches or mils.

The instrument 59 is slidably supported on the instrument support rod 55 by a support clamp 69. The support clamp 69 has suitable structure including a knurled adjusting screw 71 which, when in a loosened position, permits the support stem 65 to be manually moved up and down within the clamp 69 and in addition permits the support clamp 69 itself to also be manually moved up and down about the instrument support rod 55, as viewed in FIG. 1. Conversely, when the knurled screw 71 is tightened, friction is increased between the engaging surface of the clamp 69 and both the support rod 55 and the support stem 65, causing the instrument 59 to assume a relatively fixed position.

In operation, the device 11 is assembled substantially as illustrated in FIG. 1, i.e., the span between the flanges 15, 19 is determined and the appropriate length spacer mandrel 37 is selected and inserted into the assembly retainer barrels 39, 39' as previously described. Additionally, the adjustable collars 47, 47' are moved outwardly along the longitudinal axis of the device 11 so that the distance between parallel planes perpendicular to the longitudinal axis of the device 11 and tangent to the contact buttons 63, 63' is slightly greater than the predetermined span between the face portions of the flanges 15, 19. Prior to tightening the set screws 51, 51', the user should insure that the longitudinal axis of the instrument support rod 55 is substantially diametrically opposed to the longitudinal axis of the instrument support rod 55', as illustrated in FIG. 1.

Assuming that the shaft 17 is to be aligned with the shaft 13, the preferred procedure would be to securely anchor the equipment having the shaft 13 to its preferred foundation, e.g., a gas turbine engine or the like secured to a concrete foundation.

The equipment having the shaft 17 is roughly positioned so as to approximate the preferred distance between the face portions of the flanges 15, 19 and at an approximate same elevation. The user then snaps the device 11 into place by: First, inserting one head 33 into the appropriate socket, e.g., the head 33 into the socket 21. Secondly, he manually pushes the head 33' toward the flange 15 and directs the head 33' so that the apex thereof is in line with the socket 23. Thirdly, releasing the device 11 will allow the springs 45, 45' to urge the head 33' into the socket 23.

The user then loosens the knurled screw 71 and slides the clamp 69 along the instrument support rod 55 until the contact button 63 is adjacent the outer periphery of the flange 15. It should be understood that rotation of the clamp 69 about the rod 55 will bring the contact button 63 closer to or further away from the base portion of the flange 15, the length of the clamp 69 acting as a variable offset. In this regard, the user will insure that the contact button 63 is not only contacting the face portion of the flange 15 but the actuating plunger 61 preferably is slightly depressed so that the instrument 59 can sense a plus or minus misalignment.

It should be explained that the Starrett instrument 59 is provided with a rotatable dial, i.e., the outer circumference of the instrument may be freely rotated so as to rotate the indicia to a preferred reading. Accordingly, the user at this time preferably would zero the dial 67, i.e., rotate the outer circumference thereof until the zero mark is directly beneath the indicating hand.

The above sequence is followed for the opposite end of the device 11 so as to cause the contact button 63' to engage the outer periphery of the flange 19. The device 11 may freely be manually rotated about its longitudinal axis and the respective contact buttons 63, 63' slidably engage the outer periphery of the flanges 15, 19 along a circular path. The face portion of the flanges 15, 19 preferably are provided with scribed reference marks, i.e., a reference mark 73 (FIG. 2) being placed adjacent the periphery of the flange 15 and at an angle of approximately 90° or at the 3:00 position when using the dial of a clock for orientation; a reference mark 75 (FIG. 2) at the 6:00 position; a reference mark 77 at the 9:00 position and a reference mark 79 at the 12:00 position. The reference marks 73, 75, 77, 79 on the flange 15 and the reference marks 73', 75', 77', and 79' on the flange 19 establish points on the flanges 15, 19 so that the user may use them to better enable him to consistently place the contact buttons 63, 63' at approximately the same point when taking readings with the instrument 59, a procedure yet to be disclosed.

Undoubtedly, there are many methods equally effective for utilizing the device 11 in aligning the shaft 17 with the shaft 13, i.e., those skilled in the art will readily see how the data obtained by the device 11 can be applied to known formulas and guidelines and/or procedures for quickly aligning the shaft 17 to the shaft 13. However, the following will be considered as an example or one of many procedures: starting with the device 11 in position substantially as shown in FIG. 1, i.e., (1) the machine, having the shaft 13, is fixedly attached to its foundation (2) the machine, having the shaft 17, is brought into approximate alignment, (3) the span between the flanges 15, 19 is substantially equal to the overall length of the coupling 25 intended to rotatably connect the flanges 15, 19, and (4) the instrument 59 is in line with the reference mark 79 or the 12:00 position, and the instrument 59' is in line with the reference mark 75' or the 6:00 position.

The first task preferably is to align the longitudinal centerline of the device 11 axially with the rotating axis of the shaft 13. This is accomplished by ascertaining the radial misalignment of the shaft 17 with respect to the shaft 13, i.e., recording the readings on the instrument 59 at the reference marks 73, 75, 77 and 79 or ignoring the instrument 59'. These readings are readily calculated to determine the direction and magnitude of lateral or vertical movement required of the machine having the shaft 17. Experienced mechanics can usually determine the precise direction and distance so that only one move of the shaft 17 is necessary; however, the end result can also be accomplished by taking a succession of readings after each lateral or vertical movement of the shaft 17. This procedure is repeated until the device 11 can be rotated about its longitudinal axis for 360° of rotation while the dial 67 of the instruments 59 remains steady, i.e., does not show any reading, plus or minus, at any of the reference marks 73, 75, 77 and 79. In other words, the shaft 17 is radially aligned with the shaft 13 when the longitudinal axis of the device 11 intersects or is aligned with the rotating axis of the shaft 13, or when the instrument 59 reads zero through 360° rotation of the device 11.

The second task preferably is to axially align the shaft 17 with the shaft 13. This is accomplished by observing the instrument 59' or recording the readings on the instrument 59' at the reference marks 73', 75', 77', and 79'. Computations from these readings by the user will quickly show the quadrants of the flange 19 that are closer to and further away from the confronting flange 15 so that the machine having the shaft 17 may be moved about a stationary point at the apex of head portion 33' to correct the axial misalignment of the shaft 17. When the shaft 17 is axially and radially aligned with the shaft 13, the instruments 59, 59' will both show a zero deflection for the 360° travel about the respective face portions of the flanges 15, 19. Obviously, an important point for the user to consider when making corrections in alignment by moving the machine, having the shaft 17, is to constantly assure that the span between the face portions of the flanges 15, 19 is maintained at a distance equal to the length of the coupling 25. The remaining task is to install the coupling 25 in the usual manner, thus rotatably connecting the shaft 17 to the shaft 13.

A second embodiment of the device 11 provides the user with two readings simultaneously on each flange 15, 19. The second embodiment involves placing a second instrument support rod 255 (FIG. 3) at an angle 90° removed from the support rod 55 into a suitably positioned transversely drilled and threaded aperture (not shown) in the adjustable collar 47. The second embodiment includes an instrument 259 having a support stem 265 and a dial 267, also calibrated in mils, and a support clamp 269 having a knurled adjusting screw 271. The second embodiment of the device 11 obviously involves adding the above structure to the opposite end so that two instruments 59' and 259' (not shown) having a 90° displacement engage the outer periphery of the face portion of the flange 19, i.e., when the device 11 is constructed to conform to the second embodiment an instrument 59 will be positioned at the 12:00 position, engaging the flange 15, an instrument 259 will be engaging the flange 15 at the 3:00 position, an instrument 59' will be engaging the flange 19 at the 6:00 position, and a fourth instrument 259' (not shown) will be engaging the flange 19 at the 9:00 position. Rotation of the device 11 about its longitudinal axis now provides the user with a means of more quickly ascertaining the minute axial and radial misalignment between the face portions of the flanges 15, 19. This second embodiment is particularly beneficial for accomplishing checks or inspections of suspected misaligned shafts.

Although the invention has been described and illustrated with preferred embodiments thereof, it is not to be so limited since changes and modifications may be made thereto which are within the full intended scope of this invention.

I claim:

1: A device for indicating minute axial and radial misalignment between face portions of a driven shaft flange and a driving shaft flange intended to be coupled by a high speed coupling, said device comprising means for axially engaging said driven shaft flange, means diametrically opposed to said driven shaft for axially engaging said driving shaft flange, means supporting said driven shaft engaging means and said driving shaft engaging means at a predetermined spaced apart distance, means for urging said driven shaft engaging means outwardly from said support means, means for urging said driving shaft engaging means outwardly from said support means; first indicator means, having an actuating plunger, for measuring the magnitude of misalignment; means adjustably attaching said first indicating means to said support means with said actuating plunger thereof engaging said face portion of said driven shaft flange, second indicator means, having an actuating plunger, for measuring the magnitude of misalignment, and means adjustably attaching said second indicating means to said support means with said actuating plunger thereof engaging said face portion of said driving shaft flange so that manual rotation of the device about the longitudinal axis thereof causes the respective actuating plungers of said indicator means to rotate in unison about the face portions of the driven shaft flange and the driving shaft flange for sensing quadrants of said flanges being misaligned.

2: The device of claim 1 in which said means for axially engaging said driven and said driving shaft flanges respectively comprises elongated opposing rods having cylindrical portions at the inner ends thereof and concentric conical portions at the other ends with said conical portions being directed outwardly so that the apices of said respective conical portions may engage said driven and said driving shaft flanges along the rotating axes thereof.

3: The device of claim 2 in which said means supporting said driven shaft and said driving shaft engaging means includes an elongated intermediate rodlike member having a predetermined length, a first tubular sleevelike member having one end thereof telescopically receiving one end of said intermediate member with the other end thereof telescopically receiving said cylindrical portion of said means for axially engaging said driven shaft flange, and a second tubular sleevelike member having one end thereof telescopically receiving the other end of said intermediate member with the other end of said sleevelike member telescopically receiving said cylindrical portion of said means for axially engaging said driving shaft flange so that said apices of said respective conical portions are directed outwardly from said intermediate member.

4: The device of claim 3 in which said means for urging said driven and said driving shaft engaging means outwardly from said support means comprises a pair of elongated compression springs respectively having one end thereof engaging the ends of the rodlike member and the other end thereof engaging the end of said cylindrical portions of said driven and said driving shaft flange engaging means, and said springs being respectively concentrically received in said sleevelike members.

5: A device for indicating minute axial and radial misalignment between face portions of a driven shaft flange and a driving shaft flange intended to be coupled by a high speed coupling said device comprising a pair of elongated opposing rodlike members respectively having cylindrical portions at the inner ends thereof and concentric conical head portions at the other ends with said conical portions being directed outwardly so that the apices of said respective conical portions may engage said driven and said driving shaft flanges along the rotating axes thereof, means supporting said opposing rodlike members including an elongated intermediate rodlike member and a pair of tubular members, said intermediate rodlike member having the respective ends thereof telescopically received by the one end of said pair of tubular members with the other end of said tubular members respectively telescopically receiving said cylindrical portions of said pair of opposing rodlike members, a pair of elongated compression springs respectively concentrically received respectively within said pair of tubular members with one convolution thereof respectively resting against the inner ends of the opposing rodlike members and the opposite convolutions thereof respectively resting against the opposite ends of said intermediate rodlike member so that said opposing rodlike members are urged outwardly from said supporting means; first indicator means, having an actuating plunger, for measuring the magnitude of misalignment; means adjustably attaching said first indicating means to said support means with said actuating plunger thereof engaging said face portion of said driven shaft flange; second indicator means, having an actuating plunger, for measuring the magnitude of misalignment; and means adjustably attaching said second indicating means to said support means with said actuating plunger thereof engaging said face portion of said driving shaft flange so that manual rotation of the device about the longitudinal axis thereof causes the respective actuating plungers of said indicator means to rotate in unison about the face portions of the driven shaft flange and the driving shaft flange for sensing quadrants of said flanges being misaligned.

6: A device for indicating minute axial and radial misalignment between face portions of a driven shaft flange and a driving shaft flange intended to be coupled by a high speed coupling, said device comprising means for axially engaging said driven shaft flange, means diametrically opposed to said driven shaft flange for axially engaging said driving shaft flange, means supporting said driven shaft engaging means and said driving shaft engaging means at a predetermined spaced apart distance, said means supporting said driven shaft and said driving shaft engaging means including an elongated intermediate rodlike member having a predetermined length, a first tubular sleeve-like member having one end thereof telescopically receiving one end of said intermediate member with the other end thereof telescopically receiving said means for axially engaging said driven shaft flange, and a second tubular sleevelike member having one end thereof telescopically receiving the other end of said intermediate member with the other end of said sleevelike member telescopically receiving said means for axially engaging said driving shaft flange, means for urging said driven shaft engaging means outwardly from said support means, means for urging said driving shaft engaging means outwardly from said support means; first indicator means, having an actuating plunger, for measuring the magnitude of misalignment; means adjustably attaching said first indicating means to said support means with said actuating plunger thereof engaging said face portion of said driven shaft flange, second indicator means, having an actuating plunger, for measuring the magnitude of misalignment, and means adjustably attaching said second indicating means to said support means with said actuating plunger thereof engaging said face portion of said driving shaft flange so that manual rotation of the device about the longitudinal axis thereof causes the respective actuating plungers of said indicator means to rotate in unison about the face portions of the driven shaft flange and the driving shaft flange for sensing quadrants of said flanges being misaligned.

* * * * *